May 2, 1950     H. STAHLIN     2,506,115
SPIRIT LEVEL
Filed Feb. 6, 1945            2 Sheets-Sheet 1
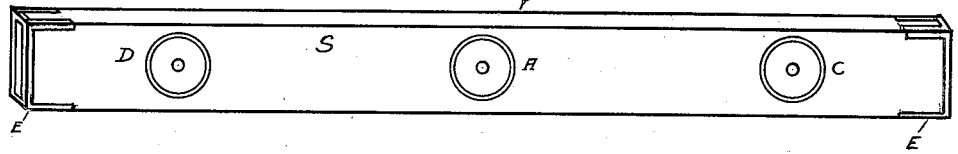
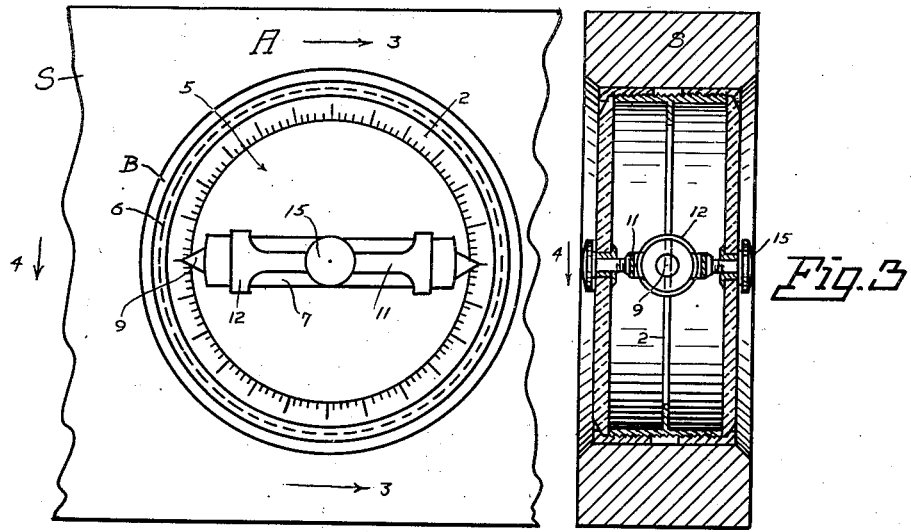
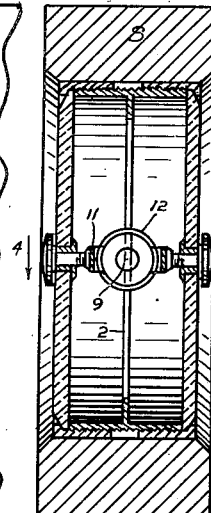
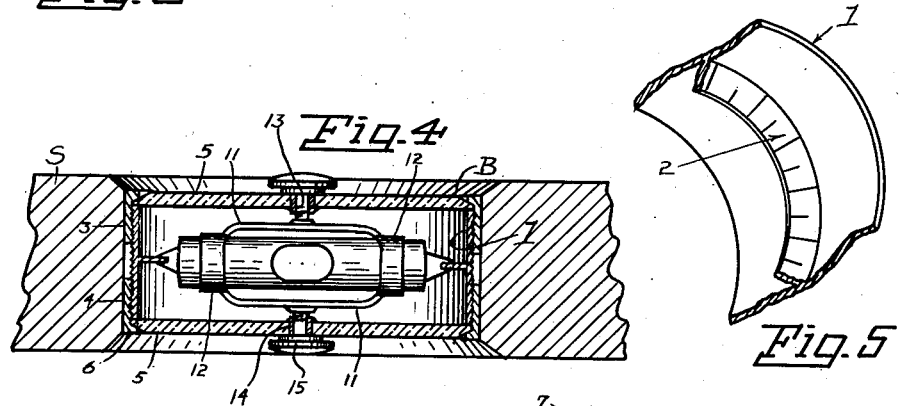
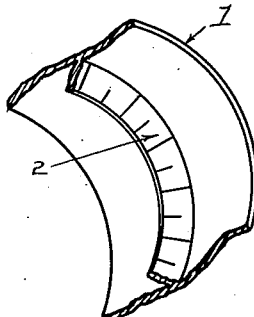
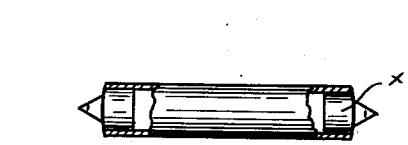
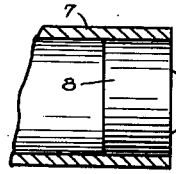
Inventor
Harold Stahlin
By Herbert E. Smith
Attorney May 2, 1950     H. STAHLIN     2,506,115
SPIRIT LEVEL
Filed Feb. 6, 1945     2 Sheets-Sheet 2
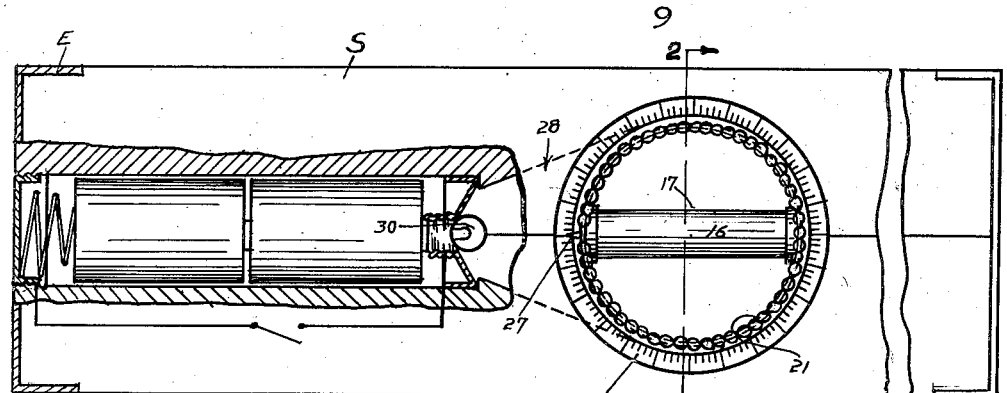
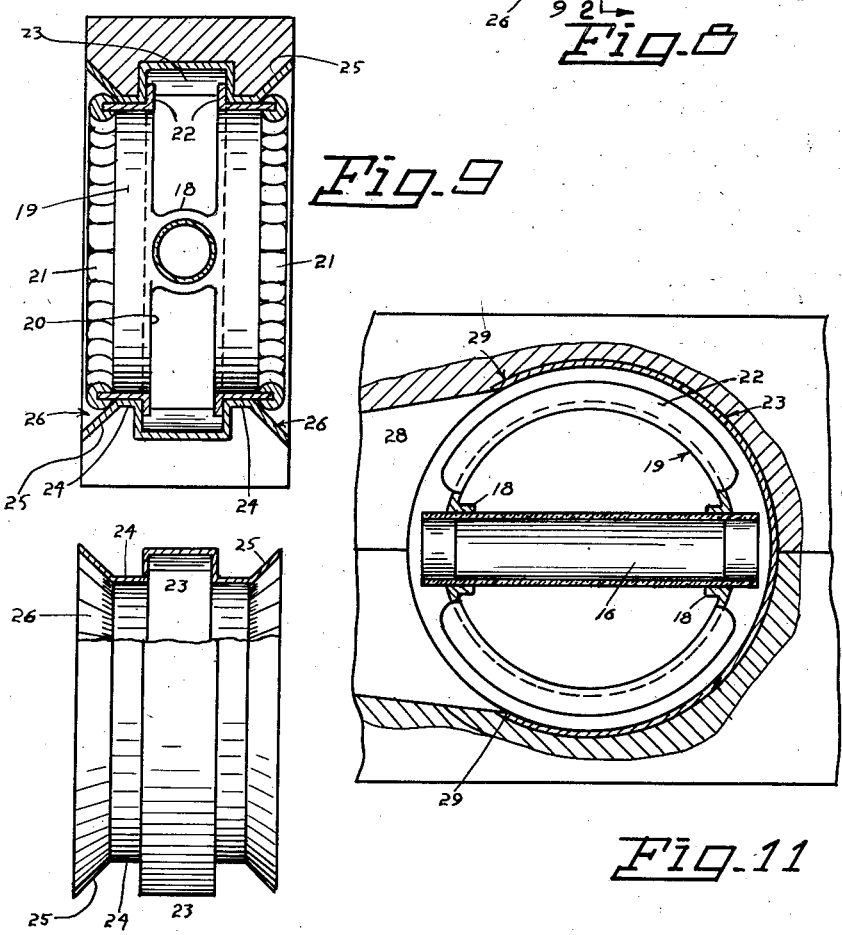
Inventor
Harold Stahlin
By
Herbert E. Smith
Attorney Patented May 2, 1950

2,506,115

UNITED STATES PATENT OFFICE 2,506,115

SPIRIT LEVEL

Harold Stahlin, Portland, Oreg.

Application February 6, 1945, Serial No. 576,392

2 Claims. (Cl. 33—213)

My present invention relates to an improved spirit level of the type employing a rotatable and automatically adjustable bubble tube mounted in a straight edge for co-action with a circular stationary calibrated index or three-hundred and sixty degree scale of the instrument. By the utilization of the combined straight edge or rule and the rotatable bubble tube and its duplicate pointers, the instrument is readily adapted for use by carpenters, brick layers and masons, plumbers, and others, in measuring angles, slopes, and inclines from a horizontal plane; for fixing either a vertical line or a horizontal standard line of direction, and for plumbing operations for various other purposes.

In the accompanying drawings two forms of the invention are illustrated, one of which involves an illuminating feature, and both of which include combinations and arrangements of a cylindrical casing, a manually rotatable carrier mounted in the casing and a bubble tube mounted in the carrier, together with co-acting means of the casing and carrier for guiding the carrier and indicating measurements made by the level. The drawings illustrate two examples of the physical embodiments of my invention, but it will be understood that various changes and alterations may be made in these exemplifying drawings within the scope of my appended claims without departing from the principles of the invention.

Figure 1 is a perspective view of a geometrical instrument embodying my invention, showing, in addition to the rotatable spirit level, a horizontal level and a vertical level, to facilitate the use of the instrument.

Figure 2 is an enlarged face view of a portion of the stock of the level, and disclosing the rotatable or oscillatable bubble tube of the spirit level.

Figure 3 is a transverse sectional view at line 3—3 of Fig. 2 showing the interior arrangement of the instrument.

Figure 4 is a sectional view of the level and stock, as at line 4—4 of Fig. 2, showing the bubble tube in full and the exterior knobs for manually adjusting the tube and its pointers.

Figure 5 is a fragmentary detail view showing the inside of the fixed cylindrical casing, and its scale ring, or guide for the pointers of the rotatable or oscillatable bubble tube.

Figure 6 is a detail view, partly in section, of the detached bubble tube.

Figure 7 is an enlarged detail sectional view at one end of the bubble tube showing one of the tube-heads and its guide-pointer, or indicator.

Figure 8 is a face view of a portion of a modified form of the spirit level, of the combined light and structure type, wherein the stock is broken away to disclose an electric light for illuminating the calibrated scale of the level.

Figure 9 is a transverse sectional view at line 9—9 of Figure 8 showing the interior of the spirit level with its reflex illuminating surfaces.

Figure 10 is a detail view, partly in section, of the fixed casing of Figure 8 showing its light reflecting surfaces.

Figure 11 is a longitudinal sectional view of a portion of the stock of the instrument, showing the fixed casing, and the adjustable tube in section.

The spirit level of the invention is embodied in a stock or straight edge S, which may be fashioned of wood, molded plastic material, or of any other suitable material, and provided with squared ends E, E. In the assembly view of Fig. 1 a central level A indicates the spirit level of my invention, and in addition, the stock or rule S is, or may be, provided with additional leveling instruments indicated at C and D.

The spirit level A is mounted in a transverse opening of the stock S which opening is fashioned with annular beveled edges B at the opposite sides of the stock, and an enclosing casing is fixed within the transverse opening for supporting the spirit level. The fixed casing includes an inner cylindrical band 1, having an interior burnished light reflecting surface, and provided with external screw threads. The light reflecting surface is fashioned with an annular flange or guide ring 2, both sides of which are graduated or calibrated with scales including three hundred and sixty degrees in angular marks. The externally threaded cylindrical band is provided with a pair of exterior sleeves 3 and 4 threaded on the band from opposite sides, and two transparent circular disks 5, 5, of suitable material provide windows at the opposite sides of the stock.

The round windows 5, 5, are retained in position by means of bevel edges or flanges 6, 6, of the sleeves 3 and 4 that hold the bevel edges of the windows against the outer opposite edges of the inner band 1; and the structure thus described provides an enclosure and support for the transparent bubble tube 7, which may be of glass or other suitable material.

The open ends of the cylindrical bubble tube are closed by means of two plugs 8, 8, each fashioned with an exterior bifurcated nib 9 having a guide slot 10, and the usual fluent material, as alcohol, with its indicating bubble, is contained in the closed tube. The bifurcated nibs, as indicated, straddle the annular flange or guide ring 2 of the casing, and the coacting nibs and ring, in addition to guiding and retaining the bubble tube in proper position, the nibs form pointers or indicators for use with the calibrated scales on the opposite faces of the guide ring.

The bubble tube is rigidly mounted in a carrier or holder which includes a yoke having parallel arms 11, 11, and spaced bushings 12, 12, the latter surrounding the opposite ends of the tube; and the carrier is provided with alined trunnions 13, 13 mounted in bearing bushings or rings 14, 14 fixed in central openings of the oppositely arranged windows 5, 5. By means of a pair of exterior, knurled knobs 15, 15, rigid with the trunnions, the bubble tube assembly may manually be turned as desired, as for instance in measuring angles from a standard line.

In the form of the invention illustrated in Figures 8-11, a spirit level of the combined light and structure type is depicted, which form of instrument, with its illuminating features, is especially adapted for use in dark and obscure surroundings. The bubble tube 16, with its bubble 17 indicated by dotted lines in Figure 8, is mounted in a pair of diametrically spaced, open cylindrical heads 18, 18 of a generally cylindrical carrier 19.

The annular wall of the carrier is cut out, as at 20, 20 to form two circumferential light slots, and the opposite circular edges of the carrier are fashioned with roughened parts or annular fingerholds, as 21, 21, for use in manually turning the carrier and its bubble tube.

The rotatable or oscillatable carrier, which is fashioned with spaced, exterior annular guide flanges 22, 22, extending along the sides of the circumferential light slots, is mounted in a casing fixed in a suitable socket or transverse opening through the stock S of the instrument. This generally cylindrical, fixed casing has a central annular exterior projection 23 forming an interior channel having interior reflecting faces or surfaces, and the channel receives and retains the guide flanges 22, 22, of the rotatable or oscillatable carrier.

At the opposite sides of the annular projection 23 are integral annular walls 24, 24, each of which terminates in an annular, beveled, flange 25, 25, and the exposed faces of these flanges are calibrated at 26, 26, through three hundred and sixty degrees, for joint use with the nib or pointer 27 on the bubble tube 16.

The fixed casing, with its exterior annular projection or rib 23, is rigidly mounted in a socket of the stock S, and the socket forms the terminal portion of an interior longitudinally disposed light chamber 28, and the walls of the casing, adjoining the light chamber are cut away, as at 29, 29, as best seen in Fig. 11, to permit uninterrupted light rays from an electric lamp 30 to enter the interior of the casing, and to illuminate the calibrations 26, 26.

A conventional type of portable electric lamp, or flashlight, is illustrated as mounted within a recess in the interior of the stock, and the lamp is controlled in usual manner by a switch located in position where it is readily accessible.

In addition to the specific light reflecting surface of the channel 23 of the casing, various other interior surfaces and parts of the casing, and also of the adjustable carrier and bubble tube, may be fashioned of material that is transparent, and which takes a high polish, to aid in the transmission of light and illumination of the two three hundred and sixty degree scales.

Having thus fully described my invention, what I claim as new and desire to secure by Letters Patent is:

1. In a spirit level, the combination with a stock and a casing fixed therein, said casing including an inner cylindrical band having an inner annular calibrated flange, an opposed threaded pair of exterior sleeves mounted on the band, and a pair of spaced transparent windows closing the ends of the band and secured thereto by said sleeves; of a manually rotatable carrier, trunnions journalled in said windows and fixed to said carrier, a bubble tube mounted in the carrier; and bifurcated nibs at the ends of the tube co-acting with the flange, for the purposes described.

2. In a spirit level the combination with a stock of a cylindrical band having an interior light reflecting surface and external screw threads, the band having a central inwardly extending annular flange calibrated on both sides, exterior sleeves threaded on the band from both ends, transparent circular disks closing the ends of the band, the sleeves having flanges clamping the said disks against the ends of the band, a bubble tube having bifurcated nibs at its opposite ends straddling the annular flange, a carrier yoke having spaced arms, bushings connecting the ends of said arms and surrounding the bubble tube, aligned trunnions on said arms extending outwardly through said windows and journalled therein, and knobs on said trunnions outwardly of the windows, whereby the bubble tube is operable and the calibrations are readable from both sides of the level stock.

HAROLD STAHLIN.

REFERENCES CITED

The following references are of record in the file of this patent:

UNITED STATES PATENTS

| Number | Name | Date |
|---|---|---|
| 318,099 | Gardner | May 19, 1885 |
| 633,589 | Hinkson et al. | Sept. 26, 1899 |
| 667,836 | Wood | Feb. 12, 1901 |
| 869,020 | Ridgely | Oct. 22, 1907 |
| 1,036,601 | Frank | Aug. 27, 1912 |
| 1,172,971 | Frank | Feb. 22, 1916 |
| 1,657,546 | Patton | Jan. 31, 1928 |

FOREIGN PATENTS

| Number | Country | Date |
|---|---|---|
| 7,940 | Switzerland | Apr. 13, 1894 |